Figure 2:
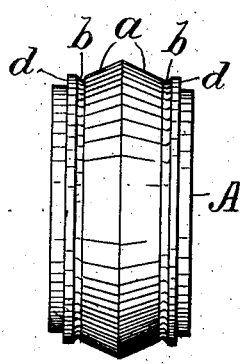

C. S. LOCKWOOD.
ROLLER BEARING WITH RESILIENT CAGE.
APPLICATION FILED APR. 28, 1910.

991,218.

Patented May 2, 1911.
2 SHEETS—SHEET 1.

Witnesses
L. Lee
J. Walter Greenbaum

Inventor
Charles S. Lockwood, per
Thomas S. Crane, Atty.

C. S. LOCKWOOD.
ROLLER BEARING WITH RESILIENT CAGE.
APPLICATION FILED APR. 28, 1910.

991,218.

Patented May 2, 1911.
2 SHEETS—SHEET 2.

Witnesses
L. Lu.
J. Walter Greenbaum.

Inventor
Charles S. Lockwood
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH RESILIENT CAGE.

991,218.   Specification of Letters Patent.   Patented May 2, 1911.

Application filed April 28, 1910. Serial No. 558,226.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings with Resilient Cages, fully described and represented in the following specification and the accompanying drawings, forming a part of the same.

This invention relates to roller bearings in which the seats for the annular friction-rolls are tapering or of conical form, as well as the rolls themselves; and the object of the invention is to facilitate the assembling of the parts, the holding of the rolls upon the hub or casing when once assembled thereon, and to hold the rolls in a working position upon their seats by a collar upon the roll engaging one end of the seat.

The drawing illustrates certain forms of the invention in which the collars upon the rolls are fitted to a groove or grooves upon the hub, and in which a cage having curved lugs adapted to hold the rolls upon the conical seat has the head of such cage divided or slit radially to permit it to expand when forcing the rolls longitudinally upon the conical seat. Such slitting of the head permits its size to vary during the assembling of the parts, thus accommodating the rolls temporarily to the exterior of the ridge $c$.

Figure 1:
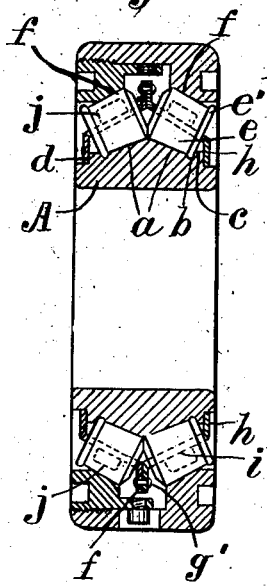
Figure 5:
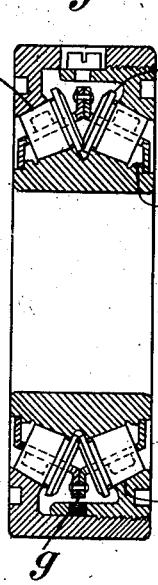
Figure 6:
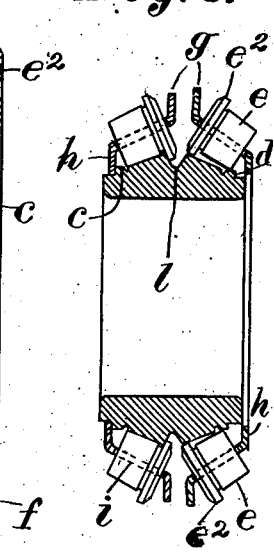
Figure 3:
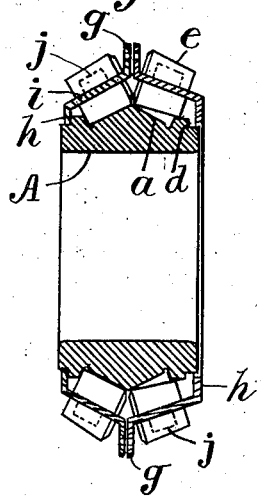
Figure 4:
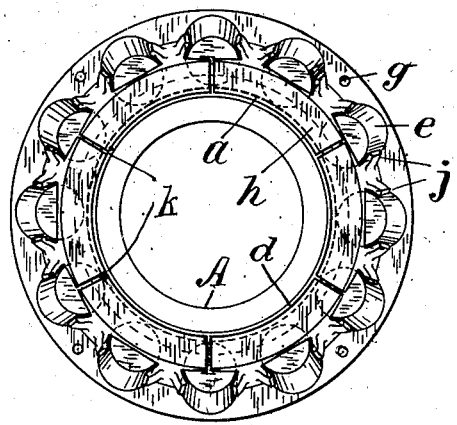
Figure 7:
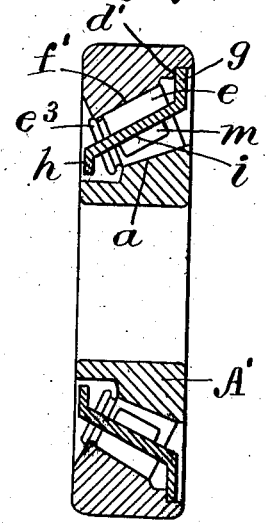
Figure 9:
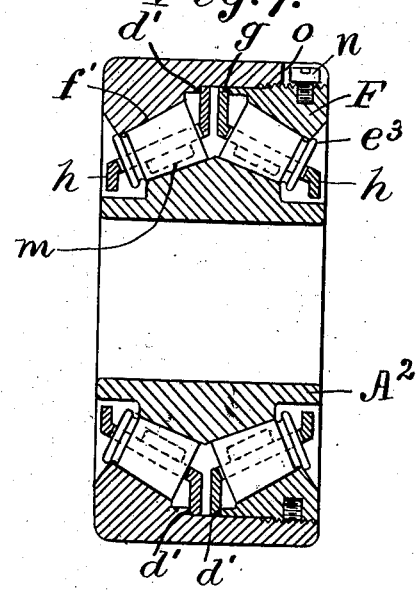
Figure 8:
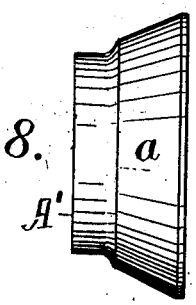
Figure 11:
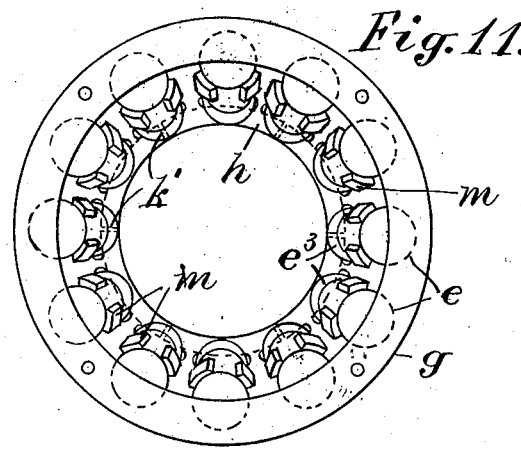
Figure 10:
Figure 12:
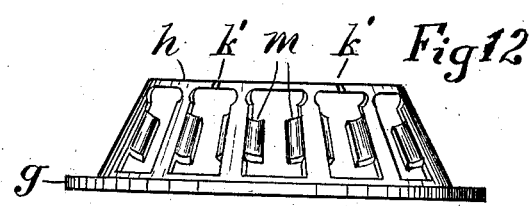

In the annexed drawing, Figure 1 is a cross section where hatched, of a roller-bearing showing collars upon the outer ends of the rolls; Fig. 2 is an elevation of the hub in such a bearing; Fig. 3 is a section of a hub and cage showing the position of the rolls when embraced by the cage and crowding them longitudinally over a flange at the outer end of the conical seat; Fig. 4 is an end view of the hub, cage and rolls carried thereby; Fig. 5 is a cross section, where hatched, showing collars upon the inner ends of the roll rotated in contact with one another; Fig. 6 shows the position of such rolls when embraced by the cage and crowding them longitudinally upon the conical seat, which necessitates the spreading or expanding of the inner head of the cage; Fig. 7 is a cross section, where hatched, of a bearing having one set of rolls with collars at their outer ends; Fig. 8 is an elevation of the hub shown in such bearing; Fig. 9 is a cross section, where hatched, of a bearing having a doubly conical hub and rolls with collars at their outer ends; Fig. 10 is an elevation of one of the rolls shown in Fig. 9; Fig. 11 shows the inner end of a cage for the bearing shown in Fig. 9, with the rolls carried by the cage; and Fig. 12 is an edge view of the cage alone.

In Fig. 1, the hub A is shown with two oppositely inclined seats $a$ joined at their bases, with a groove $b$ at the smaller end of each seat, an annular ridge or flange $c$ outside of such groove, and a rabbet upon the hub outside of such flange forming an angular seat $d$ to guide a cage. The rolls $e$ have collars $e'$ upon their outer ends fitted to the grooves $b$ upon the hub, and their inner ends roll in contact with one another. The inner faces of the ridges $c$ form shoulders which prevent any outward movement of the rolls. The casing is formed with inclined seats $f$ adapted to embrace the outer sides of the rolls.

Fig. 3 shows a similar construction without the collars $e'$ on the ends of the rolls, and Fig. 4 shows a cage adapted to the rolls of Fig. 3.

The cage of Fig. 1 is formed in two halves of sheet-metal each having a larger inner head $g$ and a smaller outer head $h$ connected by bars $i$ which lie between the rolls $e$. Curved lugs $j$ are formed upon the bars and bent to embrace the outer sides of the rolls so as to hold them positively upon the hub or casing seats. The heads $g$ are shown fastened together by rivets $g'$ after the rolls are assembled upon the hub, and the casing is then applied. When the rolls are assembled upon the hub, and the halves of the cage thus secured together, the rolls cannot escape from the cage but can be handled with the hub as a unitary structure, thus greatly facilitating the handling of the parts in manufacture and the subsequent application of the casing to the outer sides of the rolls.

The curved lugs $j$ prevent the insertion of the rolls through the openings between the cage-bars $i$, and in assembling the parts the rolls are first placed within the cage and then pressed longitudinally from the end of the hub A upon the seat $a$.

In advancing toward the seat, the collar $e'$ is compelled to slide over the elevated ridge or flange $c$, which forces the rolls farther from the center of the cage than is normal. To permit such an accommodation of the rolls to the ridge $c$, which causes an expansion of the rolls, the outer head $h$ of the cage is slit or divided radially, which permits the outer end of the cage to expand until the rolls have passed over the flange $c$ and their collars $e$ dropped into the groove $b$. Such slitting of the head $h$ is shown at $k$ in Fig. 4, and such a variation in the size of the head $h$, when forcing the rolls over the flange $c$ upon the hub is shown in Fig. 3, the outer head of the cage being then lifted from its seat upon the head, as shown in the right hand head $h$. The expansion of the head is necessitated by the resistance offered by the lugs $j$ to any outward movement of the rolls.

In Figs. 5 and 6, the rolls are shown with collars $e^2$ upon their inner ends which revolve in contact with one another and fit jointly a single groove $l$ at the bases of the conical seats $a$. In applying the cage with such rolls to the seat, the collar $e^2$ crowds the rolls outwardly, and the larger head of the cage therefore requires to be slit. The expansion of this inner head $g$ is clearly exhibited upon the right hand half of the cage, in Fig. 6.

The collars $e'$ and $e^2$ engage shoulders at the inner or outer end of the seats $a$ upon the hub; but in Figs. 7 to 11, a construction is shown in which collars $e^3$ upon the rolls engage the ends of the seats $f'$ in the casing. In this construction, the casing could not be applied to the rolls after they are set upon the hub $A'$, as the rolls could not yield to slip the collars over the seats of the casing to engage the ends of the seats. The arrangement of the lugs $j$ and the assembling of the parts are, therefore, reversed, and lugs $m$ are formed upon the inner side of the cage, as shown in Figs. 11 and 12, and are thus adapted to retain the rolls upon the seats in the casing.

With the collars fitted to the outer ends of the seats $f$ in the casing, the outer or smaller head of the cage is crowded inwardly or contracted in diameter in forcing the rolls from the larger ends of their seats to engage the collars $e^3$ with the smaller ends of the seats, and slits $k'$ are, therefore, made in such smaller head, as shown in Figs. 11 and 12, of sufficient width to permit the contraction of the head as required. Such operation of the cage applies to the bearing with a single set of rolls shown in Fig. 7, or to the bearing with doubly conical hub $A^2$ shown in Fig. 9.

With the construction of Fig. 9, the rolls $m$ are placed between the bars $i$ of the cage, and the cage and rolls inserted in the outer bearing member, the slitting of the cage-head permitting the rollers to snap over the shoulder of the bearing member. The hub $A^2$ is then placed in position, and the other cage and series of rollers engaged with the ring F in the way described for the first series. The ring F, with its cage and rolls, is then inserted in the casing and engaged therewith by the screw-thread.

One of the seats in the casing is shown upon a ring F fitted to the inside of the casing by a screw-thread, and such ring is removed in fitting one set of rolls with their cage to the opposite seat, which is integral with the shell of the casing. The other cage and set of rolls is then crowded into the loose ring F, compelling the smaller head of such cage to contract in crowding the collars $e^3$ over the larger end of the seat $f$, the cage then, by its lugs $m$, holding the set of rolls within the ring F during its application to the casing. The large head $g$ of each cage contacts, when the collar $e^3$ is against the shoulder at the end of the seat $f$, with a shoulder $d'$ upon the casing or ring F, such shoulder $d'$ preventing movement of the cage in one direction, while the collar $e^3$ upon the roll prevents the movement of the rolls and cage in the opposite direction. Each cage thus, independently of the other, holds one set of the rolls upon one of the seats $f$ in the casing. When the rolls are thus connected to their respective seats in the casing, the hub, before the ring F is inserted in the casing, is inserted within the rolls which are connected with the left hand seat, and the ring F is then inserted with the rolls connected thereto.

The screw-thread upon the ring F allows the adjustment of the seats $f$ to the two sets of rolls in the usual manner, the ring F being locked when adjusted by a screw $n$ fitted into the ring F through a notch $o$ in the casing.

Having thus set forth the nature of the invention what is claimed herein is:

1. In a roller bearing, a cage formed of sheet-metal with heads having crossbars fitted to the rolls and lugs embracing the curved sides of the rolls, and having one of the heads divided radially to permit a springing of such head in forcing the rolls with the cage upon a bearing-seat.

2. A roller bearing having a hub with a tapering seat to receive anti-friction rolls, and a shoulder at one end of the seat, tapering rolls fitted to the seat with a collar upon each fitted to the said shoulder, and a cage of sheet-metal having heads with crossbars fitted to the rolls, and lugs embracing the curved sides of the rolls, and having one of the heads divided radially to permit an accommodation of the rolls to the collar in forcing the rolls with the cage upon a bearing-seat.

3. A roller bearing having two oppositely inclined conical seats, with shoulders at the ends of the seats to guide a cage, two sets of tapering rolls fitted to the seats with a collar upon each adapted to engage a shoulder on one end of the seat, a double cage of sheet-metal each half having heads with crossbars fitted to the two sets of the rolls, a head upon each half-cage adapted to engage the shoulder at the end of the conical seat, and curved lugs upon each half-cage embracing the bodies of the rolls and operating to hold them upon the said seat.

4. A roller bearing having a hub with conical seats joined at their bases, a groove at one end of each of said seats, tapering rolls fitted to the seats with a collar upon each adapted to fit the groove at the end of its bearing-seat, a double cage of sheet-metal each half formed with heads having crossbars fitted to the rolls, and curved lugs embracing the bodies of the rolls, and one head of each half divided radially to permit the springing of the head when forcing the rolls into place upon the conical seats, and the two halves secured together for operation.

5. A roller bearing having a hub with a tapering seat to receive anti-friction rolls and a shoulder at one end of the seat, tapering rolls fitted to the seat with a collar upon each adapted to fit the said shoulder, and a cage of sheet-metal having head with crossbars fitted between the rolls, and lugs upon the cage opposite to the seat having such shoulder and embracing the curved sides of the rolls to hold them upon such seat, and having one of the heads divided radially to permit a change of form in such head in forcing the rolls with the cage upon the bearing-seat.

6. A double cage for a roller bearing, each half-cage formed with two heads connected by sloping bars forming slots adapted to fit the anti-friction rolls, and with curved lugs to embrace the bodies of the rolls, one head of each cage being divided radially to permit the springing of the head when forcing the rolls into place upon a bearing-seat, and the adjacent heads of the two halves secured together to rotate them in unison.

7. A double cage for a roller bearing, each half-cage formed with two heads connected by sloping bars forming slots adapted to fit anti-friction rolls, and with curved lugs upon the inner side to embrace the bodies of the rolls, the adjacent heads of the cage being divided radially to permit the springing of the head when forcing the rolls into place upon a bearing-seat, and such heads secured together to rotate the two halves in unison.

In testimony whereof I have hereunto set my hand in the presence of two subscribing witnesses.

CHARLES S. LOCKWOOD.

Witnesses:
 EDWARD H. MAROT,
 IVY W. ASLIN.